Patented Apr. 16, 1940

2,197,546

UNITED STATES PATENT OFFICE 2,197,546

PURIFICATION OF ESTERS

James G. Baxter and Robert L. Edwards, Rochester, N. Y., assignors, by mesne assignments, to Distillation Products, Inc., Rochester, N. Y., a corporation of Delaware No Drawing. Application December 1, 1937, Serial No. 177,613

11 Claims. (Cl. 260—475)

This invention relates to the purification of high boiling esters and especially esters suitable for use as condensation pump fluids.

High boiling esters have been found to be excellent actuating fluids for condensation pumps and reference is made to U. S. Patent 1,857,508, and U. S. patent application 143,755, filed May 20, 1937, in the name of J. G. Baxter for examples of such fluids and a description of their use in this field. To be suitable for such use, the ester must have a low vapor pressure at the operating temperature and be resistant to decomposition at its boiling point under the pressure employed. These criteria make it essential that pumping liquids be prepared in the highest attainable degree of purity. The high boiling esters of phthalic acid are among the most efficient pump liquids known, but they are especially difficult to prepare in pure condition. During the process of esterification, the ester acquires a yellow color which the present methods of purification, such as vacuum distillation, are unable to remove. Such distillates also have a slightly burnt odor undoubtedly due to the presence of decomposition products from foreign substances in the ester.

This invention has for its object to overcome the above difficulties. Another object is to provide an improved method for preparing high boiling point esters in purified condition. Another object is to provide an improved method for purifying ester condensation pump fluids. A still further object is to provide an improved method for removing odor and/or color bodies from esters of phthalic acid. Other objects will be apparent from the following description.

These and other objects are accomplished in accordance with our invention which in general comprises treating the ester with salts of perboric acid. The ester is preferably refluxed with the perborate and then separated therefrom by filtration.

In the following examples and description, we have set forth many of the preferred embodiments of our invention, but it will be understood that they are given for the purposes of illustration and not as limitations thereof.

Heating of the ester-perborate mixture during the treatment period is desirable and it is preferred that the ester be heated to reflux temperature under reduced pressure. The reflux would, of course, be constantly returned to the mixture under treatment. The degree of evacuation employed when operating in this manner will, of course, depend upon each particular ester and its properties, such as vapor pressure. Refluxing under a pressure of about .1 mm. has been found to be satisfactory for pump fluid esters in general, but higher or lower pressures can, of course, be employed. The time period of treatment will vary greatly depending upon the degree of purity of the ester and the resistance it displays to the purification treatment. Refluxing for ½ to 20 hours is satisfactory in most cases. With phthalic acid esters, which are difficult to purify, a period of about 5 to 10 hours is generally sufficient. Best results are obtained if the starting material is an ester which has been initially purified by vacuum distillation. An ester subjected to such a preliminary treatment will usually be a light brown in color. A plurality of such preliminary distillations may be advantageous.

The proportions of perborate employed can be varied greatly and will depend upon the amount of impurities and color to be removed. We prefer to use about 5 to 10 per cent of the salt based upon the weight of the ester. Salts of perboric acid such as sodium, potassium, calcium, etc., are in general satisfactory.

After the above treatment is completed, the cooled ester is separated from the mixture. This is preferably accomplished by filtering the nearly water-white ester from the brown perborate residue. The purified ester is then distilled in the usual fashion under reduced pressure. The distillate can be separated into a plurality of fractions, but it is usually sufficient to discard the first ten per cent of the total volume being distilled. Succeeding fractions will then satisfy the exacting vapor pressure requirements prescribed for condensation pump fluids.

Example I 400 grams of crude once distilled di-2-ethyl hexyl phthalate was refluxed at .1 mm. pressure for eight hours over 15 grams sodium perborate. After filtering off the perborate, the nearly colorless ester was then distilled at .1 mm. pressure to give six fractions. The first of these constituting 5 per cent of the total volume was pale yellow in color and was discarded. Succeeding fractions were colorless and entirely satisfactory for use as the actuating fluid in a condensation pump.

Example II 500 grams of crude di-2-ethylhexyl sebacate which had been given a preliminary distillation at about .1 mm. and which had a light brown color was added to 20 grams of sodium perborate and the mixture refluxed for six hours. The final separation and purification procedure was otherwise the same as that of Example I.

Although the herein described invention finds its chief and most practical use in the purification of esters for pump fluids where the requirements as to purity are exceedingly exacting, it is apparent that it can be employed to purify high boiling esters in general regardless of the particular use to which they are to be put. The process is of particular advantage for purifying phthalate esters such as di-butyl, di-hexyl, di-octyl, etc., phthalates which as a class are particularly difficult to purify.

The invention provides a simple and economical method for removing harmful substances, odors and coloring matter from high boiling esters. It is of outstanding advantage in preparing purified esters for use as condensation pump fluids. Its efficacy is surprising in view of the fact that conventional methods of purification either resulted in decomposition with formation of additional impurities or failed to adequately remove harmful impurities already present. Methods which were tried and found to be unsatisfactory were treating with absorbing agents such as fuller's earth and aluminum oxide; oxidizing agents such as mercuric oxide and aqueous potassium permanganate; and reducing agents such as zinc dust, copper-bronze powder and aqueous oxalic acid.

What we claim is:

1. In a method for purifying a high boiling point dialkyl ester of a dicarboxylic acid the step which comprises treating it with a salt of perboric acid.

2. In a method for purifying an organic carboxylic acid ester which has a relatively high boiling point and a sufficiently low vapor pressure that it is useful as a working fluid in a condensation pump the step which comprises refluxing it with a perboric acid salt under reduced pressure.

3. The method for purifying an organic carboxylic acid ester which has a relatively high boiling point and a sufficiently low vapor pressure that it is useful as a working fluid in a condensation pump the step which comprises heating the ester with a salt of perboric acid, filtering and separating the ester by vacuum distillation.

4. The method for purifying an organic carboxylic acid ester which has a relatively high boiling point and a sufficiently low vapor pressure that it is useful as a working fluid in a condensation pump which comprises refluxing the ester under reduced pressure in the presence of a salt of perboric acid, separating the ester from the salt and subjecting it to vacuum distillation.

5. In a method for purifying an organic carboxylic acid ester which has a relatively high boiling point and a sufficiently low vapor pressure that it is useful as a working fluid in a condensation pump the step which comprises alkali metal perborate.

6. In a method for purifying an organic carboxylic acid ester which has a relatively high boiling point and a sufficiently low vapor pressure that it is useful as a working fluid in a condensation pump the step which comprises refluxing the ester at a pressure of approximately .1 mm. while in the presence of sodium perborate.

7. The method for purifying a di-ester of phthalic acid which has a vapor pressure sufficiently low that it can be used as a condensation pump fluid which comprises refluxing the ester with a salt of perboric acid under reduced pressure, filtering to remove the salt and associated residue and then subjecting the ester to vacuum distillation.

8. The method for purifying a di-ester of phthalic acid which has a vapor pressure sufficiently low that it can be used as a condensation pump fluid which comprises refluxing the ester in the presence of a salt of perboric acid at a pressure of about .1 mm. filtering and then subjecting the ester to vacuum distillation.

9. The method for purifying a di-alkyl phthalate which comprises refluxing it under reduced pressure in the presence of an alkali metal perborate and then subjecting it to vacuum distillation.

10. The method for purifying a di-octyl phthalate which comprises refluxing it with sodium perborate at a pressure of about .1 mm., filtering to remove the perborate and residue and then distilling at approximately .1 mm.

11. The method of purifying a dialkyl ester of a dicarboxylic acid which comprises heating the ester under reduced pressure while in the presence of a salt of perboric acid.

JAMES G. BAXTER.
ROBERT L. EDWARDS.

CERTIFICATE OF CORRECTION.

Patent No. 2,197,546. April 16, 1940.

JAMES G. BAXTER, ET AL.

It is hereby certified that error appears in the printed specification of the above numbered patent requiring correction as follows: Page 2, second column, line 12, claim 5, after the word "comprises" insert --refluxing it under reduced pressure with an--; and that the said Letters Patent should be read with this correction therein that the same may conform to the record of the case in the Patent Office.

Signed and sealed this 3rd day of September, A. D. 1940.

(Seal)

Henry Van Arsdale,
Acting Commissioner of Patents.